UNITED STATES PATENT OFFICE.

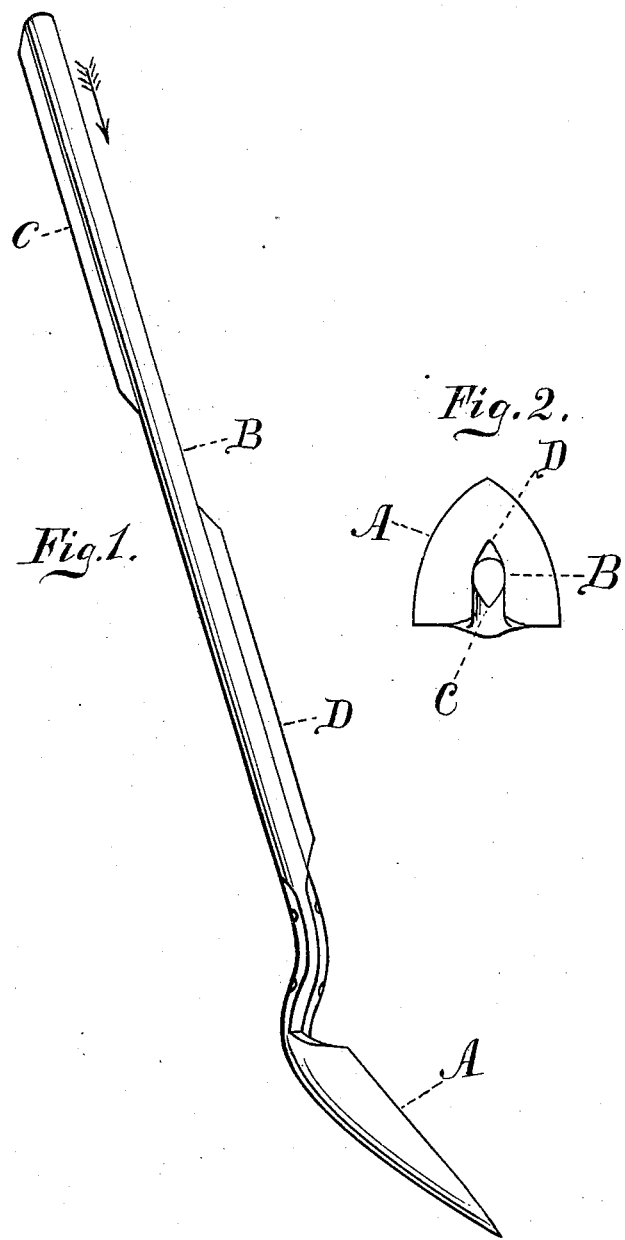

FREDERICK W. HUDSON, OF LEOMINSTER, MASSACHUSETTS.

SHOVEL.

SPECIFICATION forming part of Letters Patent No. 297,132, dated April 22, 1884.

Application filed December 17, 1883. (No model.)

*To all whom it may concern:*

Be it known that I, FREDERICK W. HUDSON, a citizen of the United States, residing at Leominster, in the county of Worcester and State of Massachusetts, have invented a new and useful Improvement in Shovels, &c., of which the following is a specification.

My improvement relates more particularly to shovels and forks having a long handle made round on its entire length.

The object of my improvement is to furnish a handle which may be more securely held in the hand and prevented from turning therein when the blade is loaded. I attain this object by the handle of the tool being made as shown in the accompanying drawings, in which—

Figure 1 represents a side or edge view of a shovel to which my improvement has been applied. Fig. 2 shows an end view of the same, when looking in the direction indicated by the arrows in Fig. 1 of the drawings.

In using the long-handled implement it is sometimes found necessary to use the entire length of the handle, while at other times only a part of the handle is used, the position of the hands upon the handle being varied according to the nature of the work to be done. In order that the hands of the operator may be placed in any position required upon the handle, (as referred to above,) it has been found advisable heretofore to make the handle round on its entire length, the objection to which is that when the blade is loaded there is a tendency for the shovel to tip toward that side which is loaded the heaviest, and the handle being small and round it is with difficulty held from turning in the hands. The object of this invention is to overcome this objection, and the object is accomplished in the following manner:

To the ordinary shovel-blade (shown at A in the drawings) I attach, in the usual manner, the handle B, upon which I have formed the two projections C and D, as shown in the drawings. These projections are preferably made in a V form, (as shown at Fig. 2 of the drawings,) and extend parallel with the handle to that length which constitutes the range of the hand upon either end of the handle when the implement is in use. One of these projections I form at that end of the handle nearest the blade, and upon its top side, (as shown at D of the drawings.) If the projection at this end of the handle were formed upon the lower side of the same instead of the top, the weight of the load would cause the projection to hurt the hand. At the opposite end of the handle (or at that end farthest from the blade) I form a second and similar projection, but place it upon the lower side of the handle, as shown at C in Fig. 1 of the drawings. I place the projection C upon the under side of the handle for the same reason that I place the projection D upon the upper side of the same, as explained above. I prefer to make the handle and its projections of one piece of wood, turned out in the shape described; but could, of course, if I so desired, make the projections separately, and afterward fasten to the ordinary handle by means of grooves, screws, or otherwise.

I do not wish to confine myself to the projections C and D being formed exactly in a V form, but intend to use that form of projection which shall best enable the object of this invention to be attained.

What I claim as new, and desire to secure by Letters Patent, is—

1. In a round shovel-handle, the projection D, formed upon the upper side thereof and upon that end nearest the blade, for the purpose herein shown and described.

2. In a round shovel-handle, the projection C, formed upon the under side thereof and upon that end of the handle farthest from the blade, for the purpose herein shown and described.

3. A round shovel-handle provided with the projections D and C, substantially as shown and described.

FREDERICK W. HUDSON.

Witnesses:
W. A. PUTNAM,
CHAS. E. HUDSON.